United States Patent [19]

Frieder et al.

[11] Patent Number: 4,645,317
[45] Date of Patent: Feb. 24, 1987

[54] EYEGLASS LENS MODULES AND METHOD

[75] Inventors: Philip M. Frieder, Miami; Edward deRojas, Lauderhill, both of Fla.

[73] Assignee: Optical Systems International Inc., Hialeah, Fla.

[21] Appl. No.: 468,700

[22] Filed: Feb. 22, 1983

[51] Int. Cl.$^4$ .......................... G02C 7/06; G02C 7/08; G02C 7/10

[52] U.S. Cl. .................... 351/164; 351/168; 351/172; 351/176; 351/177

[58] Field of Search ............................... 351/168–172, 351/164, 159

[56] References Cited

U.S. PATENT DOCUMENTS

| 2,209,587 | 7/1940 | Tillyer | 351/172 X |
| 3,877,798 | 4/1975 | Tolar | 351/172 X |
| 4,547,049 | 10/1985 | Cotie | 351/168 X |

FOREIGN PATENT DOCUMENTS

| 52-10742 | 1/1977 | Japan | 351/168 |
| 52-77738 | 6/1977 | Japan | 351/159 |
| 338555 | 11/1930 | United Kingdom | 351/164 |

Primary Examiner—John K. Corbin
Assistant Examiner—Scott J. Sugarman
Attorney, Agent, or Firm—Jack E. Dominik

[57] ABSTRACT

An eyeglass lens module in which two lens components are formed. The first component is the conventional single vision stock lens having conventional corrections in the negative or positive diopter range and, indeed, for the patient requiring only bifocals or trifocals, the single vision stock lens can be of zero correction. The second veneer over-lay lens component is desirably formed of a plastic or glass material and is as thin as practical so that it becomes a veneer cover. These veneer over-lays are in modules containing bifocals or trifocals or vocational modifications of a given diopter correction. They can also contain special vocational features such as upper bifocals for airline pilots. Once the prescription is developed according to the method of the invention, the optical glass lens blank is then fixtured for receiving the veneer over-lay.

9 Claims, 7 Drawing Figures $F_1 = +8.75$
$F_2 = -8.75$ } $F_v = 0.00$ $F_3 = +8.75$
$F_4 = -6.00$ } $F_v = +2.75$ $F_{vc} = +2.75 \supset BIFOCAL$ $F_1 = 0.00$
$F_2 = 0.00$ } $F_v = 0.00$
$F_3 = 0.00$
$F_4 = -8.75$ } $F_v = -8.75$ $F_{vc} = -8.75$ ⊃ BIFOCAL $F_1 = +8.75$
$F_2 = -8.75$ } $F_v = 0.00$
$F_3 = +8.75$
$F_4 = 0.00$ } $F_v = +8.75$ $F_{vc} = +8.75$ ⊃ BIFOCAL $F_1 = +8.75$
$F_2 = -8.75$ } $F_v = 0.00$
$F_3 = +8.75$
$F_4 = -6.00$ } $F_v = +2.75$ $F_{vc} = +2.75$ ⊃ BIFOCAL $F_1 = +6.00$
$F_2 = -6.00$ } $F_v = 0.00$
$F_3 = +6.00$
$F_4 = -6.00$ } $F_v = 0.00$ $F_{vc} = 0.00$ ⊃ BIFOCAL

EYEGLASS LENS MODULES AND METHOD

FIELD OF THE INVENTION

The present invention relates to the prescribing and forming of spectacle lenses having particular utility where bifocal, trifocal, special vocational or aphakic corrections are required.

SUMMARY OF THE PRIOR ART

At the present time most practicing opticians, optometrists and ophthalmologists have in stock spectacle lenses with given curvatures and corrections. These can range from plano to −12.00 diopters, and plano to +12.00 diopters. It is also possible for the these ranges to extend to higher powers but it is recognized that the standard operating procedure within the ophthalmic industry is to carry only the lower power lenses as described.

Spectacle retailers carry a range of stock lenses in inventory having the capacity to make spectacles for normally 30% of their patients. However, when any of these patients require a bifocal, trifocal, special vocational or aspheric lens, the retailer must order the lens from a wholesale grinding laboratory because his inventory of stock lenses is only capable of filling single vision prescriptions.

This invention provides the spectacle retailer with a kit of very thin veneer-type lens covers, each of which carries the particular bifocal, trifocal, special vocational or aspheric correction required by that particular patient. Prior art necessitated the use of a grinding laboratory because it would be impossible to carry in stock all the possible combinations of prescriptions, in addition to all the possible bifocal, trifocal, special vocational or aspheric locations resulting from each patient's particular facial measurements. The total inventory of the prior art is far beyond even the largest retailers' capabilities including those retailers large enough to having more than 2,000 locations.

This invention, by providing a kit of veneers to be optically laminated to the eyeglass retailer's single vision inventory, gives the eyeglass retailer the capability of providing spectacles for at least 90% of his patients, within one hour or two.

The present state of the art does not provide for eyeglass retailers to be able to add any available color tinting to their glass lens inventories. These lenses must be sent away to special lens coating laboratories that have extremely expensive (usually more than $150,000) glass coating equipment. This invention permits that the veneer cover lenses sometimes be made in CR-39 plastic which is tintable by the retailer just the same as his other CR-39 plastic stock lenses.

Present practice and that of the prior art involves time and delay in fitting the patient with the spectacles and loss of prompt delivery of a set of glasses which are appropriate to his prescription. Many patients with severe corrections are forced to carry one extra, or even two extra pairs of eyeglasses, or have them available since without them their sight is limited and functional capabilities are limited.

Some of the veneer lenses will also be provided in glass when desired. Thus it becomes highly desirable to provide the eyeglass retailer with a modular kit which will permit him to not only prescribe the appropriate prescription for the patient, but deliver a complete set of spectacles within a matter of one or two hours, and susceptible for immediate verification as to comfort and visual accuracy.

The prior art may be found in Class 313, subclasses 478, 479; Class 350, subclasses 417, 422, 444; and Class 351, subclasses 159, 168, 172, 176 and includes U.S. Pat. Nos. 993,812; 1,267,014; 1,304,421; 1,948,636; 2,033,101; 2,330,663; 2,611,294; 3,248,460; 3,617,116; 3,628,854; 3,702,218; 3,771,858; 3,904,281; and 3,917,766.

SUMMARY OF THE INVENTION

The present invention stems from the development of an eyeglass lens module in which two lens components are formed. The first component is the conventional single vision stock lens having conventional corrections in the negative or positive diopter range and, indeed, for the patient requiring only bifocals or trifocals, the single vision stock lens can be of zero correction. The second veneer over-lay lens component is desirably formed of a plastic or glass material and is as thin as practical so that it becomes a veneer cover. These veneer over-lays are in modules containing bifocals or trifocals or vocational modifications of a given diopter correction. They can also contain special vocational features such as upper bifocals for airline pilots. Once the prescription is developed according to the method of the invention, the optical glass lens blank is then fixtured for receiving the veneer over-lay. Prior to the laminating or gluing procedure, a sagittal gauge is applied to the posterior surface of the veneer over-lay and the anterior surface of the single vision stock lens, to determine that their curvatures are nearly equal to insure a close physical inter-fit which, in turn, will help insure an optically acceptable bond between the two. Desirably, the lens and the veneer over-lay are cut and edged to the configurations of the frame which is selected. Optionally they can be cut and edged before or after laminating. Once the two lens components are secured to each other with an optical cement which is applied with a rotary motion to minimize bubbles or other optical distortions in the cementing action, they can then be fitted into the spectacle frame and delivered to the patient. Furthermore, when tinting is required the plastic veneer over-lay can be readily tinted by conventional dye as distinguished from the expensive and time consuming coating process required with the optical glass type lens.

In view of the foregoing, it is a principal objective of the present invention to provide the practicing spectacle retailer (usually opticians, optometrists and ophthalmologists), with a pre-selected number of veneer over-lays containing bifocals, trifocals, vocational features and aspheric corrections. The eyeglass retailer can use this present in-house inventory of single vision glass or plastic lenses to be combined with the veneer over-lays thus permitting extensive control over the eyeglass manufacture to be in the hands of the party who has prescribed the particular correction necessary for the patient.

A further object of the present invention is to provide the patient with eyeglasses correct for bifocal, trifocal, special vocational or aspheric fillings and also permits customized tintings in accordance with the recommendations of the eyeglass retailer and/or prescribing doctor, as well as the taste of the patient.

A further object of the present invention is to permit fitting the patient requiring only a bifocal or trifocal correction with spectacles or sunglass spectacles and giving prompt delivery.

A further object of the present invention is to provide the eyeglass retailer with very inexpensive veneer over-lays which when combined with his own in-house stock single vision lenses, create bifocals, trifocals, special vocational and even aspheric lenses at a very reasonable cost, and maximizing the productivity of the inventory.

The combined cost of the vener over-lays and single vision lenses is inherently less expensive than the usual and customary cost of the same prescription when ordered from the wholesale prescription grinding laboratory.

A further object of this invention is to provide the consumer or patient with prompt delivery and fitting of their prescription eyeglasses even when bifocals, trifocals, special vocational, and aspheric designs are involved, and at a substantially reduced cost because all the fabrication can be done on the premises of the eyeglass retailer.

BRIEF DESCRIPTION OF THE DRAWINGS

Further objects and advantages of the present invention will become apparent as the following description of an illustrative embodiment of both the apparatus and method proceeds, taken in conjunction with the accompanying drawings, in which.

Figure 1:
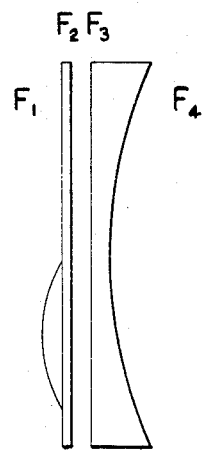
FIG. 1 is a diagrammatic view of a typical lens with a negative correction, and example of a veneer over-lay.
Figure 2:
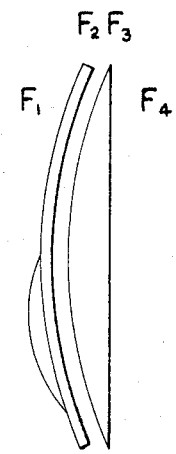
FIG. 2 is a view in the same scale as FIG. 1 illustrating a veneer over-lay bifocal in conjunction with a lens having a positive correction.
Figure 3:
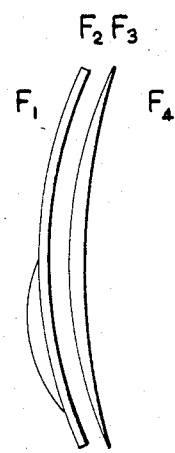
FIG. 3 is another view showing a different correction than shown in FIG. 2, but utilizing a lens having posterior and anterior curvilinearity.
Figure 4:
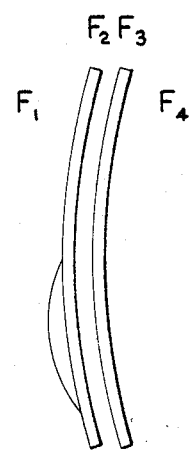
FIG. 4 is a similar example showing a typical sunglass or other eyeglass in which the principal correction is zero, with a bifocal portion.
Figure 5:
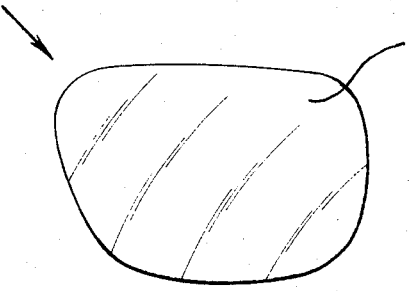
FIG. 5 is a front view of a typical single vision stock lens.
Figure 6:
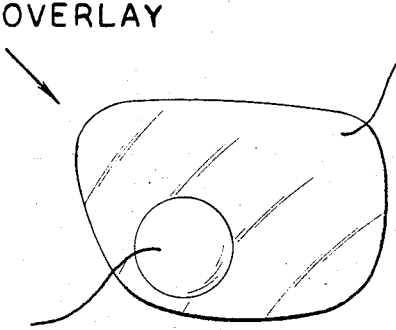
FIG. 6 is a front view of a typical single vision stock lens with the veneer over-lay.
Figure 7:
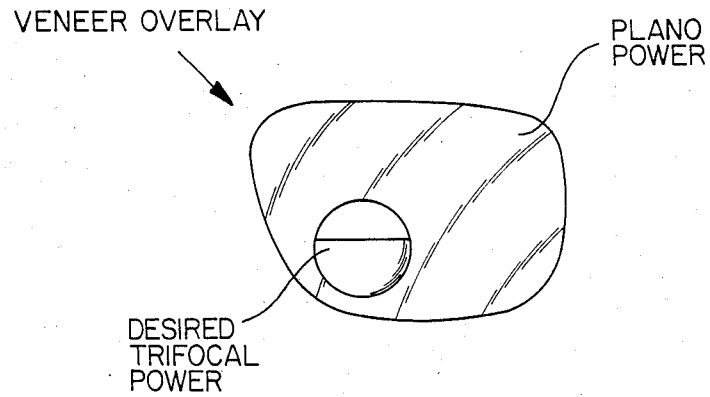
FIG. 7 is a front view of a typical single vision stock lens with the veneer overlay, but showing a trifocal lens segment.

As to each of the above, typical corrections are applied at the locations designated by the reference numerals F1, F2, F3, and F4.

THE METHOD

The method of the present invention begins with the supplying of the eyeglass retailer with optical glass or plastic corrective single vision stock lenses. If the eyeglass retailer already has an inventory of these stock lenses, then he may use the ones he already has on hand.

Next the eyeglass retailer is supplied with a pre-selected number of veneer over-lays having the plus diopter bifocal or trifocal corrections. The veneer over-lays are also formed with the conventionally used special vocational features used in the industry.

The eyeglass retailer then selects the appropriate single vision lens from his inventory and the appropriate bifocal, trifocal, or vocational veneer over-lay. The veneer over-lays are selected with respect to their bifocal or trifocal power, or other extra required features such as special vocational segment, and also with respect to their posterior curvatures. The posterior curvature of the veneer over-lay must be very similar to the anterior curvature of the single vision stock lens for a complementary close contact fit. The posterior surface of the veneer over-lay should match the anterior surface of the single vision mount preferably within a tolerance of plus or minus 0.06 diopter.

Optician's Procedure

The procedure for the use of the veneer over-lay modular system is best described by giving some examples.

Prescription #1: R.E.+1.25 0.75×90
 L.E.+1.75 0.50×85
 Add +2.50 bifocal, Pink #1
 Frame selected: #24, size 54/18

A - 54 B - 48 ED - 59

A patient having this prescription in hand with the above lens powers enters the optician's office. The optician realizes the need for bifocal lenses which heretofore would have required a telephone order to the prescription grinding laboratory and a customary delay of 3 to 15 days to acquire the lenses.

Step #1. The optician selects two single vision lenses from his inventory: For the right eye a +1.25-0.75 and for the left eye a +1.75-0.50.

Step #2. Next the optician aligns these lenses in the Lensometer for the axis and centration, as usual. At this point the optician must be sure that the cylinders have been ground on the posterior surface of each lens, so that the anterior surface is spherical and can be laminated to the veneer over-lay.

Step #3. Next the optician applies the sagittal gauge to the anterior surface of the single vision lenses to determine the anterior surface curvature value in diopters.

In the above example, the value of these single vision lenses might be 3.66 mm.

Step #4. The next step is the selection of the veneer over-lay covers having a sagittal value of 3.66 mm., and a bifocal power of +2.50 D.

Step #5. The veneer over-lays for this prescription must be susceptible to tinting, such as CR-39 plastic, since the prescription requires color, i.e. pink #1. The veneers are now tinted to the desired color using the same procedure for tinting CR-39 plastic lenses.

Step #6. The veneer over-lays are now ready for bench layout.

Determining the 'below' and 'inset'

'Below'—The desired bifocal height is measured to be 20 mm. The B measurement of the frame is 48, and when divided by 2 gives the vertical mechanical center of the frame which is 24 mm. Subtract 20 mm. the desired bifocal height, from the vertical mechanical center, 24. The result is the 'below' factor, i.e. 4 mm.

'Inset'—The frame P.D. is 54+18=72 mm. The patient's near P.D. is 60. Subtract 60 from 72 and divide the result by 2. This gives the 'inset' required. In the above example, 6 mm.

Step #7. The veneer over-lay should now be placed over a protractor so that the bifocal is positioned 4 mm. 'below' and 6 mm. 'in' from the mechanical center. This procedure should be repeated for the right and left eyes respectively, as is the usual customary procedure in these cases.

Step #8. The veneer over-lay may be laminated to the single vision lens at this point, or they may be separately edged to the shape of the frame and laminated in their 'cut and edged' form. The decision becomes an individual choice and will vary from one worker to the next.

Edge grinding of the lens components is the next step and is preferred separately since conventional grinding wheels for optical glass and plastic may or may not be compatible, and if the lenses are ground after the veneer over-lay is optically secured to the single vision lens, chipping can occur.

Once the two lens components are cut and edged for the size and shape of the pre-selected patients frame, the single vision portion is desirably placed on the fixture. Subsequently optical cement is dropped onto the outer face of the single vision lens. Thereafter the veneer over-lay is positioned atop the optical single vision lens, moved gently until the optical cement, after eliminating bubbling, has been thoroughly spread at the optical and physical interface between the two lenses.

Thereafter the two lens components are subjected to black light for about 10 to 15 seconds. This accomplishes a quick set while the two components are in the gluing fixture. Once set, the lens components can be removed from the fixture by hand and placed under a black light for one to three hours accomplishing a full cure.

The Lens Structure

The single vision glass lens component is standard known in the industry today. They are generally supplied by about two dozen major manufacturers in a variety of prescription powers. These prescription powers are generally supplied in one-quarter diopter increments and in both simple and compound prescriptions. This includes corrections for hyperopia, myopia, astigmatism and aphakia. The averages of the patients are well known in the trade and therefore a larger supply of the most popular corrections is carried by eyeglass retailers.

Usually eyeglass retailers carry inventories of standard prescription single vision lenses made from either ophthalmic crown glass having an index of refraction of 1.523, or ophthalmic plastic CR-39 lens material having an index of refraction of 1.497. The present invention contemplates that there are prescriptions specially in stronger powers, which could be made significantly thinner, lighter and have more desirable cosmetic attractiveness by using ophthalmic glass having higher indexes of refraction, such as 1.701 through 1.805. The invention herein contemplates supplying the single vision lenses of higher index of refraction when needed.

The veneer over-lay lens components are normally formed of either plastic or glass lens material. The index of refraction of the single vision lens has no relationship with the index of refraction of the material of the veneer over-lay. The veneer over-lay has no prescriptive power except for the special feature which it carries including, but not limited to, bifocal segments, trifocal segments, and special vocational combination segments. Since the veneer over-lay has no power of its own, except for the feature, its manufacture is contemplated of standard ophthalmic crown glass having an index of refraction of 1.523 and/or CR-39 ophthalmic plastic with an index of refraction of 1.497. This invention also contemplates that the veneer over-lays may be mounted onto base lenses having any index of refraction.

Various selections from given patient prescriptions are set forth in the drawings commencing with the minus diopter corrections for the near-sighted person and progressing to the plus diopter corrections for the far-sighted person and ndeed into the area of aphakia. Contemplated also are examples of the veneer over-lay having no distance prescription power, but which carry the bifocal, trifocal, vocational, or aspheric components needed for the completion of the prescription.

Although particular embodiments of the invention have been shown and described in full here, there is no intention to thereby limit the invention to the details of such embodiments. On the contrary, the intention is to cover all modifications, alternatives, embodiments, usages and equivalents of eyeglass lens modules, as fall within the spirit and scope of the present invention, specification, and appended claims.

What is claimed is:

1. A method for assembling an eyeglass lens having at least two corrections comprising the steps of:
   selecting a first prescription lens component having a given positive or negative diopter correction, and any cylinder correction prescription on the rear occular surface and a preselected front surface without cylinder corrections,
   selecting a second lens component being essentially optically plano but having a performed prescription correction at a portion of the second lens component and having a preselected rear surface complementary with the front surface of the prescription lens,
   and thereafter optically bonding the two lens components to each other, with the second lens component being the exterior portion of the lens, thereby positioning the preformed prescription correction feature on the outer second lens component.

2. In the method of claim 1 above,
   applying a bifocal correction to the second lens component during the molding of the same from an optically moldable material.

3. In the method of claim 2 above,
   preselecting a trifocal correction for the second lens component, and then securing the trifocal lens component to the first prescription lens component.

4. In any one of the methods of claims 1, 2 or 3 above,
   tinting the eyeglass lens by dyeing the second lens component.

5. In the method of any one of claims 1, 2 or 3 above,
   the second lens component being formed of plastic and being optically plano with the exception of the preformed correction feature segment corrections.

6. An eyeglass lens comprising, in combination,
   a first prescription lens component with a selected diopter correction and any cylinder correction prescription on the rear occular surface and a preselected front surface without a cylinder correction,
   a second lens component being essentially optically plano but having a preformed prescription correction at a portion of the second lens component and having a preselected rear surface complementary with the front surface of the first component,
   said two lens components being optically and physically bonded to each other,
   whereby upon preselecting the first and second lens components, the two can be optically and physically joined from a modular supply of both types of lenses with a preformed prescription correction feature supplied only by the outer second lens component.

7. In the eyeglass lens of claim 6, said second lens component having a bifocal correction.

8. In the eyeglass lens of claim 6, said second lens component having a trifocal correction.

9. In the eyeglass lens of claims 6, 7 or 8, said second lens component being a tinted plastic.

* * * * *

REEXAMINATION CERTIFICATE (1453rd)

United States Patent [19]

Frieder et al.

[11] B1 4,645,317

[45] Certificate Issued  Apr. 23, 1991

[54] EYEGLASS LENS MODULES AND METHOD

[75] Inventors: Philip M. Frieder, Miami; Edward deRojas, Lauderhill, both of Fla.

[73] Assignee: Optical Systems International, Inc., Hialeah, Fla.

Reexamination Request:
No. 90/001,579, Aug. 18, 1988

Reexamination Certificate for:
Patent No.: 4,645,317
Issued: Feb. 24, 1987
Appl. No.: 468,700
Filed: Feb. 22, 1983

[51] Int. Cl.$^5$ .................. G02C 7/06; G02C 7/08; G02C 7/10
[52] U.S. Cl. .................. 351/164; 351/168; 351/172; 351/176; 351/177
[58] Field of Search ........... 351/159, 177, 168–172, 351/163, 164, 176

[56] References Cited

U.S. PATENT DOCUMENTS

| | | | |
|---|---|---|---|
| 2,209,587 | 7/1940 | Tillyer | 351/172 X |
| 3,877,798 | 4/1975 | Tolar et al. | 351/172 X |
| 4,070,105 | 1/1978 | Marzouk | 351/159 |
| 4,095,772 | 6/1978 | Weber | 264/1.8 |
| 4,522,993 | 6/1985 | Sasaquwa et al. | 351/168 |
| 4,528,351 | 7/1985 | Tarumi et al. | 351/168 |
| 4,547,049 | 10/1985 | Cotie | 351/162 X |

FOREIGN PATENT DOCUMENTS

| | | | |
|---|---|---|---|
| 1435128 | 3/1966 | France | 351/168 |
| 52-10742 | 1/1977 | Japan | 351/168 |
| 52-77738 | 6/1977 | Japan | 351/159 |
| 58-120217 | 7/1983 | Japan | 351/168 |
| 338555 | 11/1930 | United Kingdom . | |

OTHER PUBLICATIONS

X-Cel Optical Co. (advertisement); *Optometric Weekly;* vol. 61, No. 10; Mar. 5, 1970; p. 10.

*Primary Examiner*—Scott J. Sugarman

[57] ABSTRACT

An eyeglass lens module in which two lens components are formed. The first component is the conventional single vision stock lens having conventional corrections in the negative or positive diopter range and, indeed, for the patient requiring only bifocals or trifocals, the single vision stock lens can be of zero correction. The second veneer over-lay lens component is desirably formed of a plastic or glass material and is as thin as practical so that it becomes a veneer cover. These veneer over-lays are in modules containing bifocals or trifocals or vocational modifications of a given diopter correction. They can also contain special vocational features such as upper bifocals for airline pilots. Once the prescription is developed according to the method of the invention, the optical glass lens blank is then fixtured for receiving the veneer over-lay.

REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 7 is cancelled.

Claims 1, 6 and 9 are determined to be patentable as amended.

Claims 2-5 and 8, dependent on an amended claim, are determined to be patentable.

New Claim 10 is added and determined to be patentable.

1. A method for assembling an eyeglass lens having at least two corrections comprising the steps of:
   selecting a first prescription lens component having a given [positive or negative diopter correction, and any cylinder correction prescription on the rear occular surface and a preselected front surface without cylinder corrections,] *ocular side patient total prescription of both spherical and cylindrical power correction except for a presbyopia correction, said first prescription lens component having a front surface to be covered and laminated to a second lens component,*
   selecting a second lens component being [essentially] optically plano [but having a performed prescription correction at a]  *in the distance portion of the lens and having a preformed presbyopia prescription correction feature at the front* portion of the second lens component and having a preselected rear surface complementary with the front surface of the *first* presciption lens *component,*
   and thereafter [optically] *physically* bonding the two lens components to each other, with the second lens component being the exterior portion of the lens, thereby positioning *only* the preformed *presbyopia* prescription correction feature on the *front portion of the* outer second lens component.

6. An eyeglass lens comprising, in combination,
   a first [prescription] lens component with a selected [diopter] *spherical power* correction and [any] cylinder *power* correction [prescription] on the rear [occular] surface and a preselected front surface [without a cylinder correction]*formed to be laminated to a second lens component,*
   a second lens component being [essentially] optically plano [but] *in the distance portion and* having a preformed [prescription] *presbyopia* correction at a portion [of] *on the front surface of the* second lens component and having a preselected rear surface [complementary with] *to laminate to* the front surface of the first *lens* component,
   said two lens components being optically and physically bonded to each other,
   whereby upon preselecting the first and second lens components, the two can be optically and physically joined from a modular supply of both types of lenses with a preformed [prescription correction] feature supplied only by the outer second lens component *which preformed feature has a presbyopia-type correction.*

9. In the eyeglass lens of claims 6 [,7] or 8, said second lens component being a tinted plastic.

*10. In the eyeglass lens of claims 6, 8, 9, said presbyopia correction being of a positive spherical power.*

* * * * *